Patented Mar. 16, 1943

2,314,185

UNITED STATES PATENT OFFICE 2,314,185

PROCESS FOR THE MANUFACTURE OF PROGESTERONE

Bernhard Zondek, Rehavia, Jerusalem, and Ernst Bergman, Rehovoth, Palestine

No Drawing. Application June 18, 1940, Serial No. 341,138. In the Netherlands September 1, 1939

1 Claim. (Cl. 260—397.1)

The invention relates to a process of manufacture of progesterone in a synthetic way. The manufacture of progesterone from natural gland material proved insufficient to satisfy the steadily increasing demand for this hormone. It has therefore already been tried to find methods for the synthesis of progesterone. The generally accepted way starts from stigmasterol which contains a long side chain. This side chain has to be shortened by step-wise oxidative degradation, and it is only natural that the longer the chain the more cumbersome becomes the process. Furthermore, the presence of a double bond in the ring system of stigmasterol makes it necessary to select such methods that this double bond is not affected by the oxidation reagent. Furthermore, stigmasterol is difficultly accessible, so that the above synthetic process is not satisfactory. We have now found that it is possible to synthetize progesterone from bile acids. From the standpoint of this synthesis, the bile acids possess two exceptional features, the easy accessibility and low price, and the much shorter side chain, $CH(CH_3).CH_2.CH_2.COOH$, as compared with that of the sterols. In performing this synthesis one may start from any bile acid, in particular from cholic or desoxycholic acid. The synthesis involves shortening of the side chain to an acetyl group and dehydrogenative conversion of the saturated alcohol into an $\alpha,\beta$-unsaturated carbonyl system. The order in which these two groups of operations are to be carried out, is immaterial.

Out of the various possibilities of converting bile acids into progesterone, the following which is very easily materialized, will be explained in greater detail:

Cholic acid or desoxycholic acid are converted into lithocholic acid and the latter is acetylated. Acetyl-lithocholic acid, M. P. 169° is treated with four times its weight of thionyl chloride, first at ordinary temperature, then for two hours at 70° C. The excess of the thionyl chloride is removed in vacuo at 60° and the residue additioned at 0° with the equivalent amount of bromine, which is absorbed rapidly. The crude bromination product is shaken for twelve hours with ten times its weight of water and the $\alpha$-bromo-acetyl-lithocholic acid extracted with ether and, after evaporation of this solvent, boiled with five times its weight of pure, anhydrous pyridine for three hours. When this solution is poured into cold hydrochloric acid, 3-acetoxy-cholenic acid is obtained, M. P. 171°. This is dissolved in glacial acetic acid and oxidised with an excess of 20% above the theoretical amount of chromic anhydride, dissolved in dilute acetic acid. The oxidation is performed at room temperature and completed by boiling for one hour. When the solution so obtained is diluted with water, containing sulphurous acid (in order to destroy the excess of chromic anhydride), and extracted with ether, by evaporation of the solvent a concentrated acetic acid solution of 3-acetyl-bisnor-lithocholic acid is obtained, which precipitates upon cautious addition of water. This acid, M. P. 200° described already by Reindel and Niederlander, Ber. Dtsch. Chem. Gesellsch. 68, 1969 (1935) is de-acetylated and then converted into epi-pregnane-3-ol-20-one through the following steps: Methylation by means of diazomethane, treatment with phenylmagnesium bromide and subsequently with ozone. The crude epi-pregnane-3-ol-20-one which requires no further purification is oxidised with chromic anhydride in glacial acetic acid solution and gives pregnane-dione, M. P. 200°. From the latter progesterone can be obtained by several processes, e. g., by bromination, conversion of the bromo-pregnane-dione into its pyridinium salt and dry distillation of the latter in a high vacuum. In this way pure progesterone is easily obtained of a melting point of 121° and optical rotation $(\alpha) = +193°$.

What we claim is:

In a process for the manufacture of progesterone from bile acids the step of converting lithocholic acid into 3-hydroxycholenic acid by substitution of bromine in the $\alpha$ position of the carboxylated side chain and splitting off hydrobromic acid, and into bisnor lithocholic acid by oxidative degradation of the 3-hydroxycholenic acid.

BERNHARD ZONDEK.
ERNST BERGMAN.